United States Patent [19]

Lizzi et al.

[11] Patent Number: 4,561,019

[45] Date of Patent: Dec. 24, 1985

[54] FREQUENCY DIVERSITY FOR IMAGE ENHANCEMENT

[75] Inventors: Frederic L. Lizzi, Tenafly, N.J.; Marek Elbaum, Dobbs Ferry; Ernest J. Feleppa, Rye, both of N.Y.

[73] Assignee: Riverside Research Institute, New York, N.Y.

[21] Appl. No.: 494,633

[22] Filed: May 16, 1983

[51] Int. Cl.[4] .............................................. H04N 7/18
[52] U.S. Cl. ..................................... 358/112; 73/602; 128/660; 455/306
[58] Field of Search .......................... 358/112; 73/602; 128/653, 660; 455/306; 364/414

[56] References Cited

U.S. PATENT DOCUMENTS

| 3,737,799 | 6/1973 | Ständer | 455/306 |
| 4,044,359 | 8/1977 | Applebaum | 455/306 |
| 4,228,804 | 10/1980 | Holaser | 73/602 |
| 4,412,350 | 10/1983 | Miedema | 455/306 |
| 4,471,785 | 9/1984 | Wilson | 73/602 |

FOREIGN PATENT DOCUMENTS

0890072 12/1981 U.S.S.R. ................................ 73/602

OTHER PUBLICATIONS

Acoustic Speckle: Theory and Experiment Analysis, by J. G. Abbott et al.
Frequency Compounding for Speckle Contrast Reduction in Phased Array Images, by P. A. Magnin et al.
A Wavelength Diversity Technique for Reduction of Speckle Size, by: M. Elbaum et al.
SNR in Photocounting Images of Rough Objects in Partially Coherent Light, by M. Elbaum.

*Primary Examiner*—Britton Howard W.
*Attorney, Agent, or Firm*—Brumbaugh, Graves, Donohue & Raymond

[57] ABSTRACT

Methods for improving the availability of information derived from signals received from an object irradiated with coherent pulses of any form of radiation that exhibits a wave nature are disclosed. A method for reducing speckle derives separate component noncoherent signals from the received signals, and combines these separate noncoherent signals to form improved composite noncoherent signals. Weighting and processing of component signals can be applied as a function of time, frequency, and signal amplitude to optimize speckle reduction in all or a critical part of the signal by compensating for the range and frequency dependence of attenuation and the frequency dependence of scattering phenomena. In a method for enhancing resolution, separate component coherent signals are derived from the received signals, weighted and processed, and combined to form improved composite coherent signals; then noncoherent signals are derived from the improved composite coherent signals. In both methods, signals can be processed either in the analog or digital domains or in hybrid analog/digital domains. The apparatus for performing each method also is disclosed.

36 Claims, 7 Drawing Figures

FREQUENCY DIVERSITY FOR IMAGE ENHANCEMENT

FIELD OF INVENTION

This invention relates to methods and apparatus for improving the availability of information derived from broadband pulses of any form of coherent radiation, such as electromagnetic and ultrasonic radiation, that exhibits a wave nature. More particularly, in cases where speckle degrades the information of interest, this invention relates to methods and apparatus for reducing speckle with minimal compromise of other system figures of merit, such as resolution. In cases where the resolution available in current applications limits the information available, the invention method and apparatus permit resolution enhancement up to the band-limiting constraints imposed by noise. One example of the described methods and apparatus is reduction of speckle in images obtained by scanning with pulsed, coherent, broadband, ultrasonic energy.

BACKGROUND OF THE INVENTION

When forming images with coherent radiation, the desired distribution of image energy is subject to undesirable random modulation. This random distribution of energy is known as speckle and is manifested in visual images as flecks of random intensity and size distributed across the image. Speckle arises from constructive and destructive interference due to random phase cancellations and additions of the coherent field scattered by the coherently illuminated object. The power spectrum of speckle depends upon the spectrum of the coherent signal carrier, the texture or spatial distribution of scatterers in the field, the size of the irradiated object volume, and the transfer function of the receiving and imaging system.

One frequency-diversity technique to suppress speckle in coherent optical images was first demonstrated and reported in "A Wavelength Diversity Technique for Reduction of Speckle Size," by M. Elbaum, M. Greenebaum, and M. King, *Optics Communications, Volume 5*, Number 3, pp. 171-174, June, 1972, which describes the use of multiple frequencies to reduce speckle in optical systems. In this method, the intensity distributions of images obtained by transmitting narrow-band coherent illumination at different frequencies are superimposed (added) noncoherently. For this method to be effective, the spectrum of the illuminating energy must be selected to assure that object-scattered signals at component illuminating frequencies are decorrelated by virtue of object texture. Such conditions are described in "SNR in Photocounting Images of Rough Objects in Partially Coherent Light," by M. Elbaum and P. Diament, *Applied Optics, Volume 15*, Number 9, pp. 2268-2275, September 1976.

In ultrasonic diagnostic or materials-inspection systems, a broadband, coherent pulse of ultrasonic energy is directed into an object being examined and is scattered upon transmission through the object. Scattered energy is then detected coherently to produce a voltage signal having a spectrum equivalent to the irradiating signal spectrum, but altered by the effects of attenuation, scattering, and interference phenomena. Irradiating pulses can be transmitted at different orientations (e.g., with angular, or linear displacements of the illuminating beam between pulses) or at different times. Scattered signals can be processed (envelope detected) to form video signals from which an image can be generated. Because these images are generated from coherent echo signals, they are subject to speckle degradation as are coherent images produced by coherent light.

Four prior approaches for reducing speckle effects in ultrasound signals have been demonstrated. All suffer from (1) degradation of system figures of merit such as resolution, (2) complexity of transmission and scanning methods and apparatus, or (3) extended acquisition time.

One prior approach used in ultrasonic scanning systems generates reduced-speckle images by directing ultrasonic bursts or pulses from several different directions, then adding the obtained images noncoherently or superimposing them. A second prior approach involves noncoherently adding sequentially obtained images. However, both of these approaches suffer disadvantages. The method using pulses from several directions assumes that refraction does not preclude proper alignment of component images. The method using sequential pulses assumes that no major tissue motion occurs during the examination period. Neither of the foregoing assumptions are necessarily true, and particularly in medical systems, serious resolution degradation can result either from motion or acoustic refraction.

A third prior approach applies low-pass filtering to the video signal, which in effect blurs the image, and reduces the distracting effect of speckle having a high spatial frequency. However, this approach also degrades resolution.

A fourth prior approach sequentially transmits ultrasound in different frequency bands. The separate images formed from echoes in each of these bands are added, which supresses speckle in the resulting image because the speckle in each constituent image is not correlated. However, a separate transmission is required for each frequency band, which increases the time of examination and requires a complicated transmission system. In medical imaging and other applications, the risk of image degradation due to motion increases as examination time increases.

SUMMARY OF THE INVENTION

The present invention is directed to a method and apparatus for obtaining improved information from finite-bandwidth pulses of any form of coherent radiation having a wave nature. Where speckle degrades the desired information, the invention decreases the effects of speckle with minimal compromise of other system figures of merit such as resolution. In cases where the resolution provided by conventional methods limits the available amount of desired information, the invention enhances resolution. An example is the improvement of images obtained by scanning with coherent, ultrasound pulses having finite bandwidth.

Bandwidth as defined here is the spectral range over which a signal can be distinguished adequately from noise. As an illustration, high-quality diagnostic ultrasound instruments have a bandwidth on the order of magnitude of the instrument center frequency, e.g., a 10-MHz ophthalmic instrument may provide an adequate signal-to-noise ratio over a bandwidth of 10 MHz (5 to 15 MHz), or a 3-MHz abdominal instrument may cover a 2-MHz bandwidth. However, the described methods and apparatus are applicable and useful over greater and smaller bandwidths than the cited illustrations.

In one form, a method for reducing speckle according to the invention comprises transmitting coherent energy of broad but finite frequency bandwidth toward an object, receiving the signals scattered by the object to derive therefrom a plurality of separate component narrow-band noncoherent signals each representative of the components of said scattered signals in component frequency bands within the bandwidth of the received signal, and combining the component noncoherent signals to generate a composite signal in which speckle is suppressed. Processing and weighting can be applied to coherent and noncoherent signals depending on the application and the system in which these methods are applied, and they can operate on signals as a function of frequency band, signal amplitude, and time. Noncoherent signals can be derived from coherent signals by a variety of means including, for example, envelope detection and analytic-signal processing.

According to another form of the invention, a method for enhancing resolution comprises transmitting coherent energy of broad but finite frequency bandwidth toward an object, receiving coherent energy scattered by the object with a broad but finite frequency bandwidth similar to that of the transmitted energy, filtering the received signal into a plurality of component narrowband coherent signals within the bandwidth of the received signal, weighting and processing the separate component coherent signals, combining the weighted and processed component coherent signals to form a composite coherent signal, and deriving a composite noncoherent signal from the composite coherent signal. The resolution of the composite noncoherent signal is enhanced compared to the resolution of a noncoherent signal derived directly from the original coherent signal. As in the case of speckle suppression, weighting and processing applied to the separate coherent signals to optimize resolution enhancement can operate on these signals as a function of frequency band, signal amplitude, and time.

According to the invention, the primary difference between the methods for reducing speckle and enhancing resolution is that in the method for reducing speckle, combining is performed after deriving noncoherent signals from coherent signals whereas in the method for enhancing resolution, combining occurs first. Therefore in the speckle reduction case, noncoherent signals are combined whereas coherent signals are combined in the resolution enhancement case.

Signal processing for speckle suppression or resolution enhancement can be done in either the analog domain or digital domain. According to other forms of the invention, apparatus for reducing speckle and for enhancing resolution are also disclosed.

In ultrasonic applications, the present invention can be practiced using most current, high-quality, commercially available instruments with no modification to the transmission components. In ultrasonic imaging, it can significantly improve image quality and the information made available in visual form by either reducing speckle while maintaining or improving other system figures of merit such as resolution, or by simply improving resolution.

For a better understanding of this invention and other objects thereof, reference is made to the following description taken in conjunction with the accompanying drawings. The scope of the invention is defined in the appended claims. It should be understood that the use of ultrasonic, particularly medical ultrasonic, examples is for illustrative and descriptive purposes only, and the present invention applies generally to any form of pulsed, coherent, broadband radiation that exhibits a wave nature.

BRIEF DESCRIPTION OF THE DRAWINGS

The following drawings illustrate ultrasonic applications of the present invention.

DESCRIPTION OF THE PREFERRED EMBODIMENT

In the following description of the embodiment according to the invention, medical ultrasonic applications are used for illustration. Ophthalmic applications are well suited by a −15 dB system bandwidth of 10 MHz centered at 10 MHz, while other medical and nonmedical ultrasonic applications of the present invention would utilize other appropriate frequency bands. For example, abdominal-scan instruments would use lower frequencies. Furthermore, nonultrasonic systems using pulsed, broadband, coherent, wave energy would utilize appropriate and applicable frequency parameters.

The inventors have implemented the digital form of the embodiment for speckle suppression. This form has been implemented with high-quality clinical ultrasonic instruments used in ophthalmic and abdominal examinations. The ophthalmic instrument typically utilizes a nominal 10-MHz centered frequency-transducer having an approximately 10-MHz useful bandwidth as defined in this application. The abdominal instrument typically utilizes a nominal 3-MHz center-frequency transducer with a 2-MHz useful bandwidth. Both instruments are representative of high-quality units in their respective diagnostic applications.

Figures 1, 2, 3, 4:
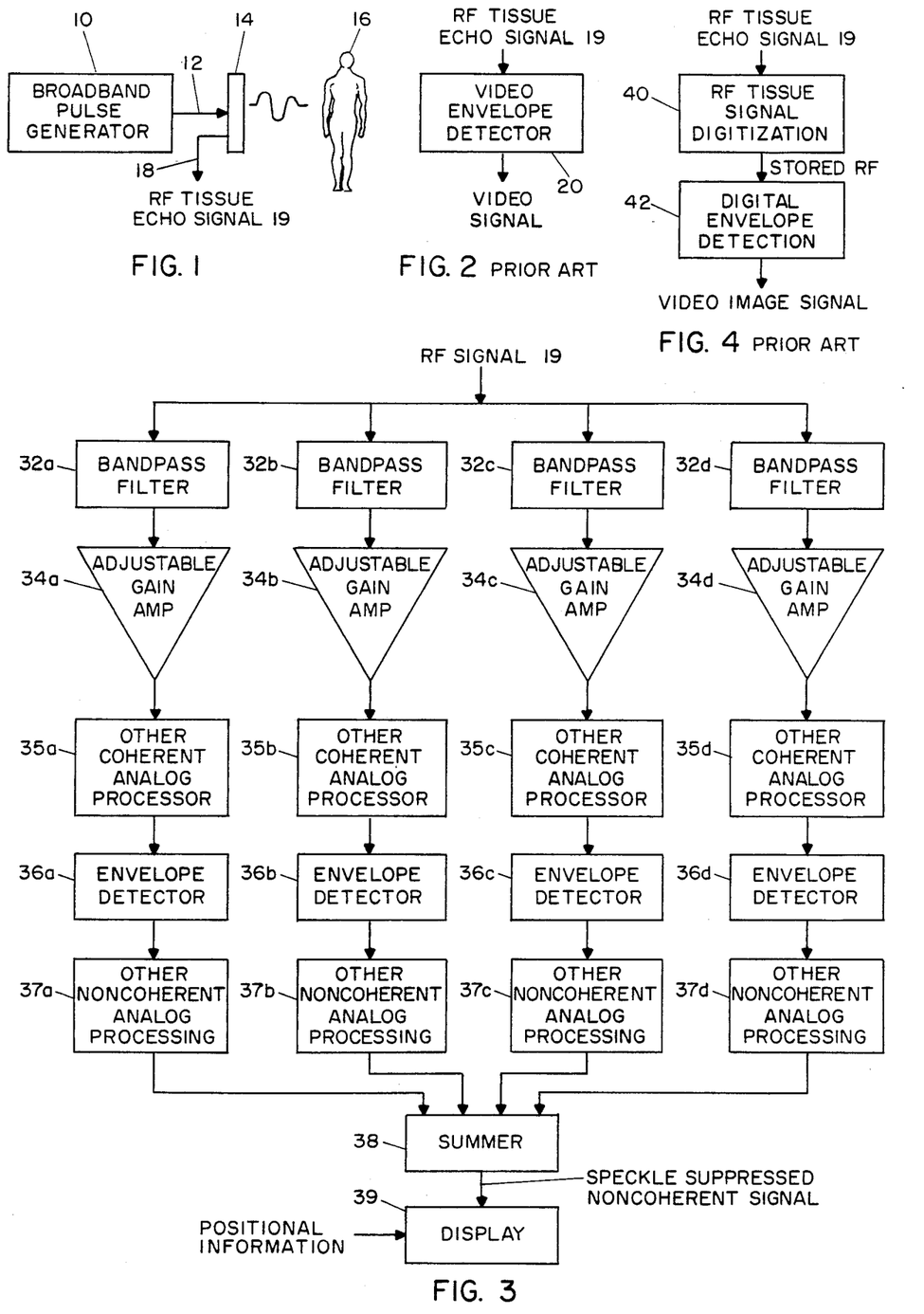
FIG. 1 illustrates, in block form, an ultrasonic scanning system for producing rf (coherent) echo signals.
FIG. 2 illustrates, in block form, a prior art analog ultrasonic imaging system for producing video (noncoherent) signals from rf echo signals.
FIG. 3 illustrates, in block form, an analog ultrasonic imaging system for producing speckle suppressed video signals from rf echo signals in accordance with the invention.
FIG. 4 illustrates, in block form, a prior art digital ultrasonic imaging system for producing video signals from rf echo signals.

Referring to FIG. 1, a prior art pulse-echo method uses a pulse generator 10 to produce a broadband voltage pulse on line 12 to excite a transducer 14 which generates and transmits a broadband ultrasonic pulse. The transmitted pulse is scattered by scattering elements along its propagation direction, and scattered energy impinges upon a receiving transducer. While the transmitting transducer also functions as a receiving transducer in a pulse-echo configuration, a separate transducer can be used to receive the scattered energy. The receiving transducer converts scattered ultrasonic energy to electrical energy as a coherent, broadband voltage signal termed an rf (radio-frequency) signal. The transducer may comprise any suitable piezoelectric material with suitable provision for beam shaping.

Referring to FIG. 2, a prior art analog system for producing video signals includes the components of FIG. 1, plus an envelope detector 20, which amplifies the received rf signal to a suitable level, and then rectifies and filters it. Envelope detection converts coherent (bipolar, phase-containing) rf signals to noncoherent (devoid of phase) video signals, which can be used (along with positional information regarding transducer orientation) to generate an image. Such video signals contain undesired speckle, which would be apparent in an image generated from them.

FIG. 3 illustrates a novel analog system for producing speckle-suppressed video signals according to the invention. The system comprises a plurality, in this case four, analog band-pass filters 32 which receive the rf signal from a transducer 14. Each filter 32 has a bandwidth (pass band) narrower than the bandwidth of the broadband signal pulse. In this illustration, the bandwidth of each filter might be about one fourth the overall system bandwidth. As illustrated here, the bands are nonoverlapping, adjacent and generally equally sized. (By way of example, in ophthamic applications, the first pass band might be 5.0–7.5 megahertz, the second 7.5–10.0 megahertz, the third 10.0–12.5 megahertz and the fourth 12.5–15.0 megahertz.) However, there is no requirement that the bands be equal in width and uniformly spaced. Another feasible implementation is the use of band-pass filters having equal Q, where Q is, in effect, the ratio of filter center frequency to bandwidth at the half-power (3-dB) points.

The output of respective band-pass filters 32 are provided to associated adjustable-gain amplifiers 34. To compensate for the higher amplitude of rf signals 19 near the midpoint of the system frequency band, weighting of the signals can be done, whereby the adjustable-gain amplifiers 34a and 34d associated with the first and fourth pass bands may be set to have a higher gain than the adjustable-gain amplifiers 34b and 34c associated with the more central second and third pass bands. This type of weighting is applied as a function of frequency band. Additional frequency band processing can be used to compensate for the effects of attenuation and scatterer size. Since attenuation usually increases as a function of frequency, the gain of the amplifiers associated with the higher frequency bands can be increased compared to the gain of amplifiers in the lower frequency bands. In the simplest case, gain adjustments (in dB) to correct for the effect of frequency-dependent attenuation might be proportional to the center frequency of each pass band. In addition, attenuation decreases echo signal strength as a function of depth, i.e., as a function of time. Therefore, time-varying gain may be applied to correct for the time-dependence of echo signal strength. Some scattering phenomena are frequency dependent, e.g., scatterers that are much smaller than the wavelengths of ultrasound being used tend to produce stronger echo signals at high frequencies than at low frequencies. To correct for this form of the frequency dependence of echo signal strength, the gain of amplifiers in the higher frequency bands can be decreased compared to the gain of amplifiers in the lower-frequency bands. The actual gain settings can be set based on predetermined criteria or interactively to optimize the presentation of a feature of interest. It should be understood that the weighting factors may be equal (e.g., all may have a value of unity) and time-varying gain may be constant.

The output from each adjustable-gain amplifier 34 undergoes additional coherent analog processing in processor 35 if desired, and is then provided to an associated component for deriving a noncoherent signal, e.g., envelope detectors 36. The outputs from envelope detectors 36 are noncoherent signals that can be converted to images and displayed on a video monitor. Although the images from the different pass bands contain speckle, the speckle pattern in the several images are ideally uncorrelated by virtue of the texture of the scanned object over the frequency band of the ultrasound. The outputs of the envelope detectors 36 undergo noncoherent analog processing in processor 37 if desired, and are then provided to a summer 38, which noncoherently adds the uncorrelated speckle and correlated signal components derived from features of the objects. The effect of summing is to reinforce true, desired detail and to reduce uncorrelated speckle. Consequently, the output of the summer 38 is a signal having decreased speckle content compared to the speckle content of the video signal produced by the prior art system of FIG. 2. Speckle-suppressed signals along with positional information may be provided to a two-dimensional display device 39 such as a video monitor to generate an image. Note that this invention implicitly includes speckle reduction by generating separate images from separate noncoherent signals derived as described here, then processing the images if appropriate, and adding them by any means, including photographic multiple exposure for example, to generate a composite image with suppressed speckle.

Figure 6:
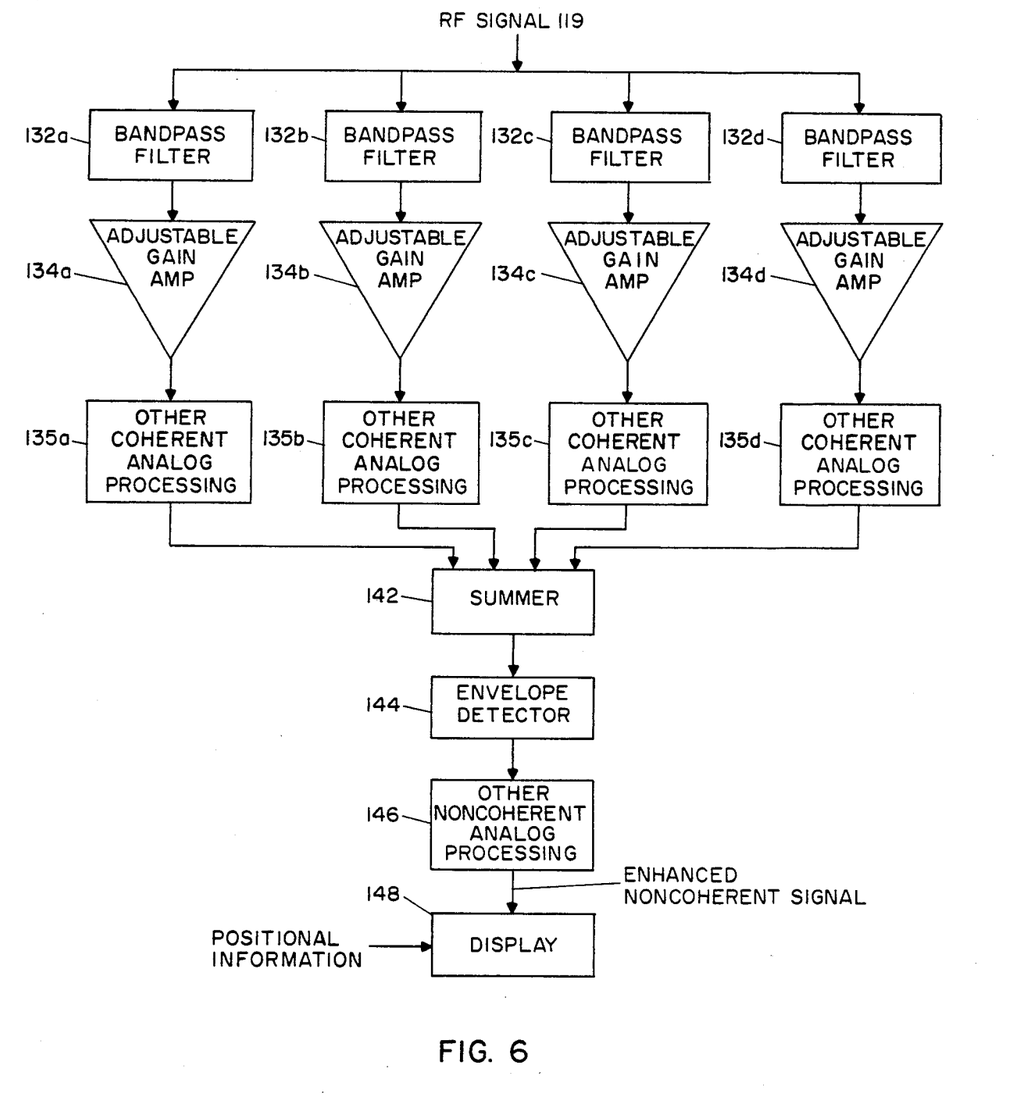
FIG. 6 illustrates, in block form, an analog ultrasonic imaging system for producing resolution-enhanced noncoherent signals from rf echo signals in accordance with the invention.

As illustrated in FIG. 6, a summer 142 can be applied to a coherent signal prior to deriving a noncoherent signal from the coherent signal, e.g., by passing the coherent signal through an envelope detector 144. In this manner, the summer 142 sums coherent, rather than noncoherent signals as in FIG. 3. Gain adjustment in device 134 increases the signal content near the band edges and therefore, up to the limit imposed by signal-to-noise ratio, increases the effective bandwidth. In other words, more of the theoretically available bandwidth is utilized. This effective increase in bandwidth improves resolution. As in the case of speckle suppression, weighting can be applied as a function of frequency dependence (to correct for frequency-dependent attenuation and the frequency dependence of scattering strength), and as a function of time (to correct for the attenuation of echo signals with increasing range). The resulting resolution-enhanced signal along with positional information may be provided to a two-dimensional display device 148, such as a video monitor, to generate an image with information improved in terms of resolution.

Figure 5:
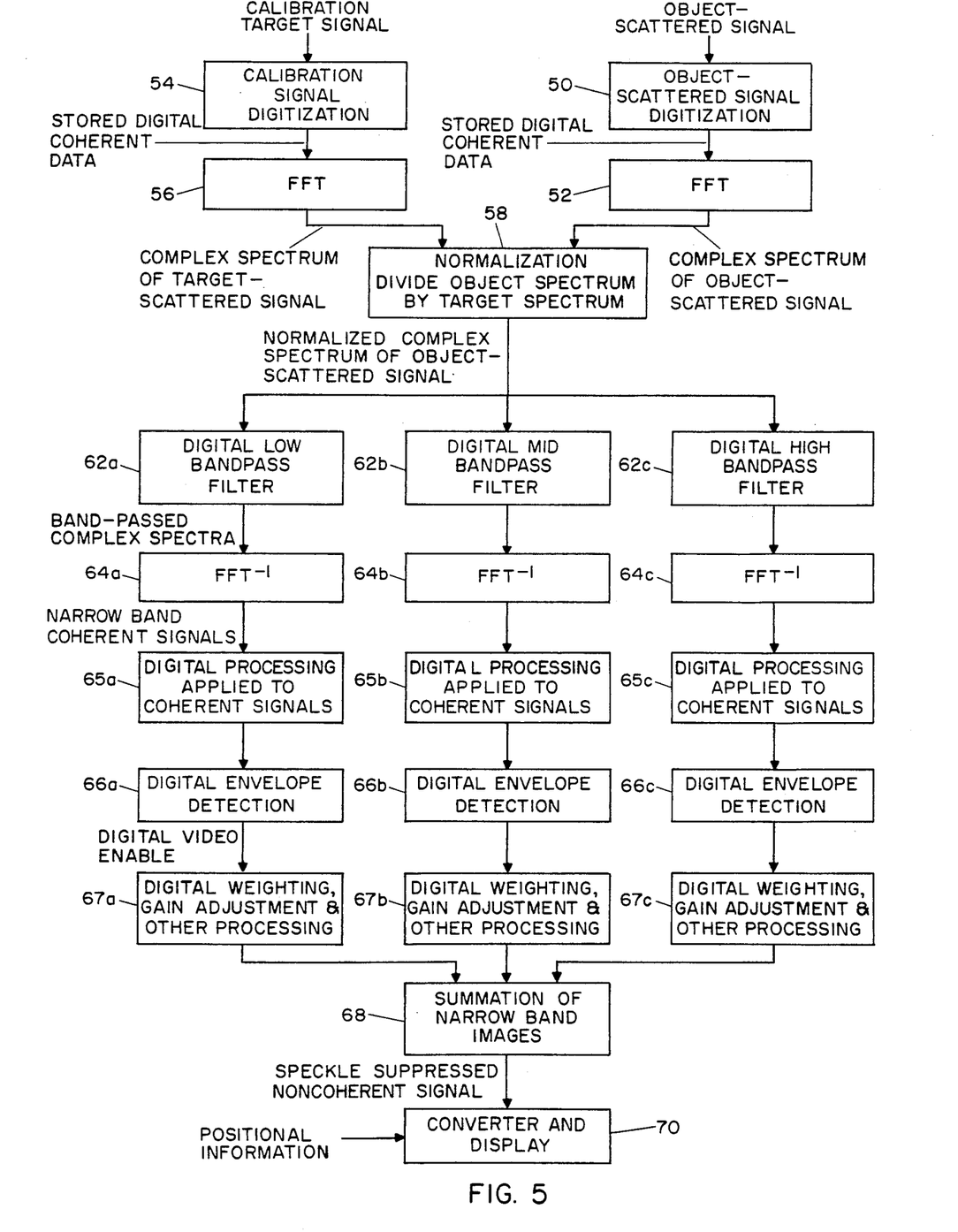
FIG. 5 illustrates, in block form, a digital ultrasonic imaging system for producing speckle suppressed video signals from rf echo signals in accordance with the invention.
Figure 7:
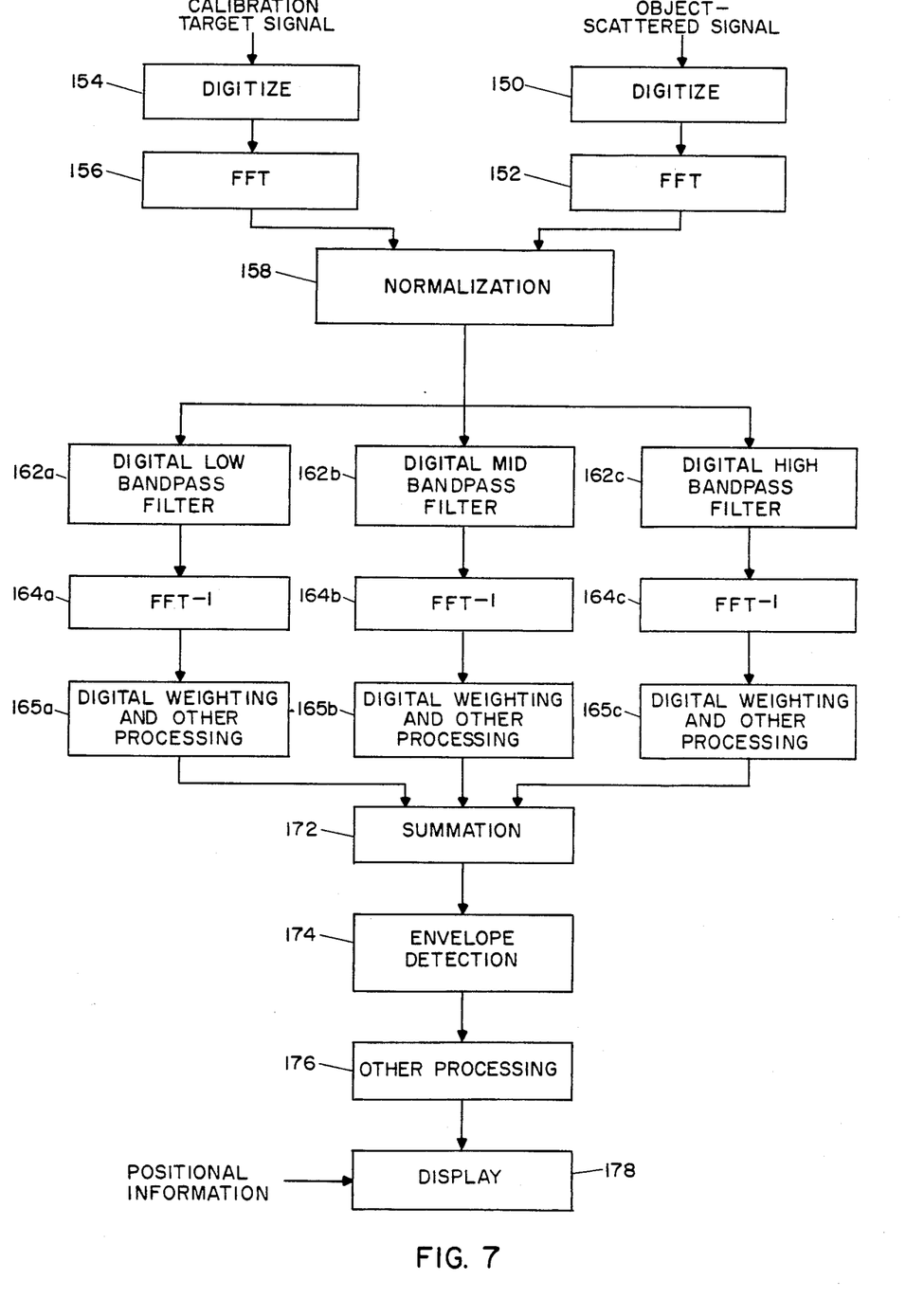
FIG. 7 illustrates, in block form, a digital ultrasonic imaging system for producing resolution-enhanced noncoherent signals from rf echo signals in accordance with the invention.

While the above systems of FIGS. 2, 3 and 6 are directed to analog systems, the systems illustrated in FIGS. 4, 5 and 7 relate to digital systems. The blocks in FIGS. 4, 5 and 7 depict digital, computer functions (computational steps) rather than electronic modules or components as are depicted by the blocks in FIGS. 2, 3 and 6.

With reference to FIG. 4, a prior art digital system comprises a signal digitizer (analog-to-digital converter, or ADC) 40 that outputs a digital representation of the rf signal from the analog input rf signal. This digital signal may be subjected immediately to digital envelope detection 42 or stored (on computer tape or disc) before subsequent envelope detection 42. The result of digital envelope detection 42 is a digital representation of a video signal, which may be passed, along with positional information, through a digital scan converter to a two-dimensional display such as a video monitor, or stored for later use or display. Such video signals contain undesired speckle for the reasons discussed above.

With reference to FIG. 5, a digital speckle-suppression system according to the invention first subjects a received rf signal to analog-to-digital conversion 50 in which an analog rf signal is converted to a digital form. These digital data may be subjected immediately to fast Fourier transformation (FFT) 52 or stored for a time interval before transformation 52. The transformation 52 provides a signal that is the complex spectrum of the received signal derived from energy scattered by the object (tissue or material). This spectrum contains information concerning the amplitude and phase of the object-scattered signal together with information related to characteristics of the transmitting and receiving system. These characteristics are associated with properties of system components. In an ultrasound system, these components would include the transducers, amplifiers, attenuators, and other components. Other factors that modify the computed spectrum relate to diffraction and attenuation in all structures through which transmission occurs.

The system shown in FIG. 5 includes means for calibrating the system. In this system, a coherent broadband ultrasound pulse is directed toward a glass plate or equivalent calibration target (not shown). The signal scattered by this calibration target is provided to a signal digitizer (analog-to-digital converter or ADC) 54, whose output is either processed immediately or stored on computer tape or disc for subsequent processing. The output is subjected to a fast Fourier transformation (FFT) 56. The FFT 56 output is the complex spectrum of the calibration target modified by the system response, and describes the system characteristics that are included in the spectrum generated by FFT operation 52. Normalization operation 58 reduces many of the system-induced features in the spectrum generated by FFT operation 52; normalization divides the output of FFT 52 by the output of FFT 56 to generate a normalized complex spectrum signal that ideally contains only the characteristics of the object-scattered signals.

Typically, the amplitude of the signal near the lower and upper ends of the bandwidth of the unnormalized spectrum is less than the amplitude of the spectrum at the middle of the bandwidth. Normalization 58 functions to increase the relative amplitude of the spectrum at the lower and upper ends of the usable signal-to-noise region of the system bandwidth. At a given range, this provides generally equal signal strength across the entire bandwidth, with two exceptions mentioned in the discussion of analog configurations of the invention. The first exception is the effect of attenuation, which is frequency dependent and therefore reduces the spectral amplitude more at high than at low frequencies. The second exception is the effect of scatterers having properties that can influence the spectrum. As an example, scatterers that are much smaller than the wavelengths of ultrasound used in the system scatter more strongly at high than low frequencies. Consequently, when pulse-echo systems are used, normalized spectra of such scatterers can increase with frequency.

The normalization operation described here is a desirable, but not essential, step in speckle suppression. When speckle suppression per se is the objective, processing and weighting separate coherent or noncoherent signals to balance signal strength in each frequency band often is sufficient for optimizing speckle suppression.

The output of the normalization operation 58 (i.e., the normalized complex spectrum) is subjected to digital band-pass filtering by a plurality of, in this case three, digital band-pass filters 62. For ultrasonic ophthalmic applications that use a 10-MHz center frequency and bandwidth, digital band-pass filters 62a, 62b and 62c may be implemented using 3.33-MHz passbands covering the system bandwidth, over the respective ranges of 5.00–8.33 MHz, 8.33–11.67 MHz, and 11.67–15.00 MHz. However, other applications may be better suited by other frequency ranges and passbands. Furthermore, instead of dividing the bandwidth into three equal, nonoverlapping and adjacent passbands, the bandwidth may be divided up into only two or more than three passbands. In addition, while preferable, the passbands do not need to be equal, adjacent, or have nonoverlapping ranges. For example, one useful, readily implementable option is to have adjacent band-pass filters of equal Q, where Q is the ratio of filter center frequency to half-power (3-dB) bandwidth.

The respective outputs of the digital band-pass filters 62a, 62b and 62c are subjected to respective inverse fast Fourier transformation (FFT$^{-1}$) 64a, 64b and 64c. The result of each of these inverse transformations is a digital representation of a narrowband rf signal which is centered on a different frequency. The narrowband rf signals may undergo digital processing 65a, 65b and 65c as a function of frequency-band, signal-amplitude or time before being subjected to respective further digital processing to derive a noncoherent signal, e.g., digital envelope detection 66a, 66b and 66c. The separate digital representations of noncoherent signals may undergo digital weighting, gain adjustment including range-dependent adjustments and other processing 67 before being added by summing step 68, which provides a digital representation of a summed or combined signal. According to the invention, the uncorrelated speckle present in the separate noncoherent signals tends to cancel so that the resultant combined signal contains less speckle than a signal obtained directly (i.e., without bandpassing and combining) from the scattered signal using the prior art system of FIG. 4. This speckle-reduced signal, along with positional information, may be provided to a digital scan converter and two-dimensional display 70, such as a video monitor for presentation as an image, or the information may be stored for later use or display.

Since the portions of the signals in each band may be of unequal amplitude after normalization, additional balancing or weighting of the separate image signals may be desirable to optimize speckle suppression. Such balancing or weighting can be performed by digital gain adjustment either before or after derivation of noncoherent from coherent signals. Here, gain adjustment 67 is applied to separate noncoherent signals. Each signal is optimized by applying appropriate frequency-band, signal-amplitude, and time-dependent weighting so that the resultant image or critical region of the image is optimized in terms of speckle suppression. This optional balancing can be achieved by scaling each image to have a preselected amplitude or by optimizing speckle suppression per se in the entire image or in a selected region of an image. This option is desirable because signal attenuation increases with signal frequency and with depth, and because ultrasound scattering due to scatterers that are much smaller than the wavelengths of incident ultrasound increases with signal frequency. The effects of attenuation or small scatterers can be measured or calculated and compensation can be effected by adjusting the signal of each component image or image region before summing the images to provide for more complete speckle reduction throughout the image or in a selected or critical region. The above effects need not be measured or calculated, but instead the adjustments can be set on an empirical basis to minimize residual speckling. It should be understood that the weighting factors may be equal, e.g., all may have a value of unity.

As in the analog case described in conjunction with FIG. 6, digital implementation of resolution enhancement can be performed as illustrated in FIG. 7 so that derivation of noncoherent signals (e.g., by envelope detection) 174 is performed after coherent summation 172 of band-passed signals to thereby effect an improvement in resolution. Digital band-pass filtering 162, followed by separate adjustment of signal amplitude in blocks 165 within each band and as a function of time (to compensate for attenuation) permits tailoring the spectral properties of the signal and optimizing the signal in terms of resolution enhancement. Coherent summation 172 and derivation of a noncoherent signal (e.g., by envelope detection) 174 following amplitude tailoring provide an enhanced-resolution signal suitable for presentation as an image on a video monitor 178. The degree of resolution enhancement possible is determined by the available bandwidth of the system, defined previously as the band over which signal is discernible from noise.

From the foregoing, it will be observed that numerous variations and modifications may be effected without departing from the true spirit and scope of the novel concept of the invention. For example, those skilled in the art will recognize that the apparatus and method disclosed in FIGS. 5 and 7 may be implemented by means of a suitably programmed microprocessor or programmed computer to process the digital signals. It is to be understood that no limitation with respect to the specific method, frequency range, application, and apparatus illustrated herein is intended or should be inferred. It is of course intended to cover by the appended claims all such modifications as fall within the scope of the claims.

We claim:

1. A method of reducing speckle in signals received from an object irradiated with finite-bandwidth, coherent pulses of any form of radiation that exhibits a wave nature, comprising:
   generating finite-bandwidth, coherent pulses and transmitting said pulses toward an object;
   receiving the signals scattered by said object to derive therefrom separate, component, noncoherent signals, each representative of the components of said scattered signals in component frequency bands within said finite bandwidth; and
   combining the component, noncoherent signals to obtain composite noncoherent signals, wherein the degradation of the signals due to speckle is less than in noncoherent signals derived directly from the original received signals.

2. The method as set forth in claim 1 wherein the step of receiving comprises:
   receiving the signals scattered by said object with a coherent receiver;
   filtering said received signals to obtain separate, component, coherent signals having different frequency content; and
   deriving separate noncoherent signals from the separate coherent signals.

3. The method as set forth in claim 2 further including, after the step of filtering, the step of weighting and processing said component, coherent signals separately as a function of such parameters as time, frequency content and signal amplitude.

4. The method as set forth in claim 2 further including, after the step of deriving separate noncoherent signals, the step of weighting and processing said component noncoherent signals separately as a function of such parameters as time, frequency content, and signal amplitude.

5. The method as set forth in claim 1 further including the step of transforming said composite noncoherent signals into a set of composite signals that map the irradiated object into a form suitable for inspection, such as an image.

6. The method as set forth in claim 2 wherein the steps of filtering, deriving separate noncoherent signals, and combining are performed on signals in the analog domain.

7. The method as set forth in claim 2 further including the step of digitizing the received signals, and wherein the steps of filtering, deriving separate noncoherent signals, and combining are performed on signals in the digital domain.

8. The method as set forth in claim 2 wherein the step of filtering comprises passing the received signals through at least two band-pass filters having substantially nonoverlapping, adjacent and equal pass bandwidth characteristics to obtain at least two filtered signals having different frequency content.

9. The method as set forth in claim 2 wherein the step of filtering comprises passing the received signal through at least two band-pass filters having substantially nonoverlapping adjacent passbands and about equal Q factor.

10. The method as set forth in claim 2 further including the step of normalizing the received signals to compensate for characteristics in system components to provide signals containing information more accurately representing information from said scattering object.

11. The method as set forth in claim 1 further including the steps of separately mapping the irradiated object from each of the separate noncoherent signals, separately processing each of said mappings, and combining the separate mappings into a composite mapping, wherein the degradation of the mapping due to speckle is less than in a mapping of noncoherent signals derived directly from the original received signals.

12. A method of enhancing resolution in signals received from an object irradiated with a finite-bandwidth, coherent pulse of any form of radiation that exhibits a wave nature, comprising:
   generating finite-bandwidth, coherent pulses and transmitting said pulses toward an object;
   receiving the signals scattered by said object with a coherent receiver;

filtering said received signals to obtain separate, component, coherent signals having different frequency content;

weighting said component, coherent signals separately as a function of frequency content;

combining said component, coherent signals to obtain composite coherent signals; and deriving noncoherent signals from said composite coherent signals, wherein the resolution of the noncoherent signals is enhanced compared to noncoherent signals derived directly from the original received signals.

13. The method as set forth in claim 12 wherein the step of weighting comprises processing said component, coherent signals separately as a function of such parameters as time, frequency content and signal amplitude.

14. The method as set forth in claim 12 further including the step of transforming the derived noncoherent signals into signals that map the irradiated object into a form suitable for inspection, such as an image.

15. The method as set forth in claim 12 wherein the steps of filtering, weighting deriving noncoherent signals, and combining are performed on signals in the analog domain.

16. The method as set forth in claim 12 further including the step of digitizing the received signals, and wherein the steps of filtering, weighting, deriving noncoherent signals, and combining are performed on signals in the digital domain.

17. The method as set forth in claim 12 wherein the step of filtering comprises passing the signals through at least two band-pass filters having substantially nonoverlapping, adjacent and equal pass bandwidth characteristics to obtain at least two filtered signals having different frequency content.

18. The method as set forth in claim 12 wherein the step of filtering comprises passing the signals through at least two band-pass filters having substantially nonoverlapping adjacent passbands and about equal Q factor.

19. The method as set forth in claim 12 further including the step of normalizing the received signals to compensate for characteristics in system components and to provide signals containing information more accurately representing information from said scattering object.

20. Apparatus for reducing speckle in signals received from an object irradiated with a finite-bandwidth, coherent pulse of any form of radiation that exhibits a wave nature, comprising:

means for generating finite-bandwidth, coherent pulses and transmitting said pulses toward an object;

means for receiving the signals scattered by said object and for deriving therefrom separate, component, noncoherent signals, each representative of the components of said scattered signals in component frequency bands within said finite bandwith; and means for combining said component, noncoherent signals to obtain composite noncoherent signals, wherein the degradation of the signals due to speckle is less than in noncoherent signals derived directly from the received signals.

21. Apparatus as set forth in claim 20 wherein the means for receiving and deriving comprises:

means for receiving the signals scattered by said object with a coherent receiver;

means for filtering said received signals to obtain separate, component, coherent signals having different frequency content; and means for deriving separate noncoherent signals from the separate coherent signals.

22. Apparatus as set forth in claim 21 further including means for weighting and processing said component, coherent signals separately as a function of such parameters as time, frequency content, and signal amplitude.

23. Apparatus as set forth in claim 21 further including means for weighting and processing said component noncoherent signals separately as a function of such parameters as time, frequency content, and signal amplitude.

24. Apparatus as set forth in claim 20 further including means for transforming said composite noncoherent signals into a set of composite signals that map the irradiated object into a form suitable for inspection, such as an image.

25. Apparatus as set forth in claim 21 further including means for digitizing said received signals, and wherein the signals filtered, derived and combined are digital signals.

26. Apparatus as set forth in claim 21 wherein the means for filtering comprises at least two band-pass filters having substantially nonoverlapping, adjacent and equal pass bandwidth characteristics to thereby obtain at least two filtered signals having different frequency content.

27. Apparatus as set forth in claim 21 wherein the means for filtering comprises at least two band-pass filters having substantially adjacent passbands and about equal Q factor.

28. Apparatus as set forth in claim 20 further including means for normalizing the received signals to compensate for characteristics in system components and to provide signals containing information more accurately representing information from said scattering object.

29. Apparatus as set forth in claim 20 further including means for separately mapping the irradiated object into a form suitable for inspection, such as an image, from each of the separate noncoherent signals, means for separately processing each of said mappings, and means for combining the separate mappings into a composite mapping, wherein the degradation of the composite mapping due to speckle is less than in a mapping of noncoherent signals derived directly from the received signals.

30. Apparatus for enhancing resolution in signals received from an object irradiated with a finite-bandwidth, coherent pulse of any form of radiation that exhibits a wave nature, comprising:

means for generating finite-bandwidth, coherent pulses and transmitting said pulses toward an object;

means for receiving the signals scattered by said object with a coherent receiver;

means for filtering said received signals to obtain separate, component, coherent signals having different frequency content;

means for weighting said component, coherent signals separately as a function of frequency content;

means for combining said component, coherent signals to obtain composite coherent signals;

means for deriving noncoherent signals from said composite coherent signals, wherein the resolution of the noncoherent signals is enhanced compared to noncoherent signals derived directly from the original received signals.

31. Apparatus as set forth in claim 30 wherein the means for weighting comprises means for processing said component, coherent signals separately as a function of such parameters as time, frequency content and signal amplitude.

32. Apparatus is set forth in claim 30 further including means for transforming the derived noncoherent signals into signals that map the irradiated object into a form suitable for inspection, such as an image.

33. Apparatus as set forth in claim 30 further including means for digitizing said received signals, and wherein the signals filtered, weighted, combined, and derived are digital signals.

34. Apparatus as set forth in claim 30 wherein the means for filtering comprises at least two band-pass filters having substantially nonoverlapping, adjacent and equal pass bandwidth characteristics to obtain at least two filtered signals having different frequency content.

35. Apparatus as set forth in claim 30 wherein the means for filtering comprises at least two band-pass filters having substantially nonoverlapping, adjacent passbands and about equal Q factor.

36. Apparatus as set forth in claim 30 further including means for normalizing the received signals to compensate for characteristics in system components and to provide signals containing information more accurately representing information from said scattering object.

* * * * *